United States Patent [19]

Takahashi et al.

[11] Patent Number: 5,104,298

[45] Date of Patent: Apr. 14, 1992

[54] DIAPHRAGM-TYPE AIR PUMP WITH AN EFFICIENT CORE

[75] Inventors: Keizo Takahashi, Mino; Noboru Bando, Takatsuki, both of Japan

[73] Assignee: Takatsuki Electric Mfg. Co., Ltd., Osaka, Japan

[21] Appl. No.: 660,829

[22] Filed: Feb. 26, 1991

Related U.S. Application Data

[60] Division of Ser. No. 340,838, Apr. 19, 1989, Pat. No. 5,013,223, which is a continuation-in-part of Ser. No. 231,553, Aug. 12, 1988, abandoned.

[30] Foreign Application Priority Data

Aug. 20, 1987 [JP] Japan ................................ 62-207291
Sep. 4, 1987 [JP] Japan ......................... 62-135872[U]
Sep. 4, 1987 [JP] Japan ................................ 62-222233
Sep. 14, 1987 [JP] Japan ......................... 62-140538[U]

[51] Int. Cl.$^5$ ............................................. F04B 43/04
[52] U.S. Cl. .................... 417/415; 417/413; 310/17
[58] Field of Search ............... 417/413, 415; 310/13, 310/15, 17

[56] References Cited

U.S. PATENT DOCUMENTS 3,784,334 1/1974 Hilgert .................................. 417/13

FOREIGN PATENT DOCUMENTS 0252881 11/1986 Japan .................................. 417/413

Primary Examiner—Richard A. Bertsch
Assistant Examiner—David W. Scheuermann
Attorney, Agent, or Firm—Armstrong, Nikaido, Marmelstein, Kubovcik & Murray

[57] ABSTRACT

A diaphragm-type air pump capable of reducing leakage magnetic flux and effectively utilizing gap magnetic flux between a main pole and a side pole of an electromagnetic core, by (1) enlarging a distance between the main pole and the side pole and making tips of the main pole and the side pole approach to each other; (2) by reducing a sectional area of the main pole; or by (3) arranging a plurality of main poles parallel and/or vertical to a vibration direction of a rod having permanent magnets. A most effective utilization of electromotive force of the electromagnet enables the remarkable improvement of pump capacity, and the lightening and miniturization of pumps.

2 Claims, 10 Drawing Sheets

FIG.6a (PRIOR ART)
FIG.6b (PRIOR ART)
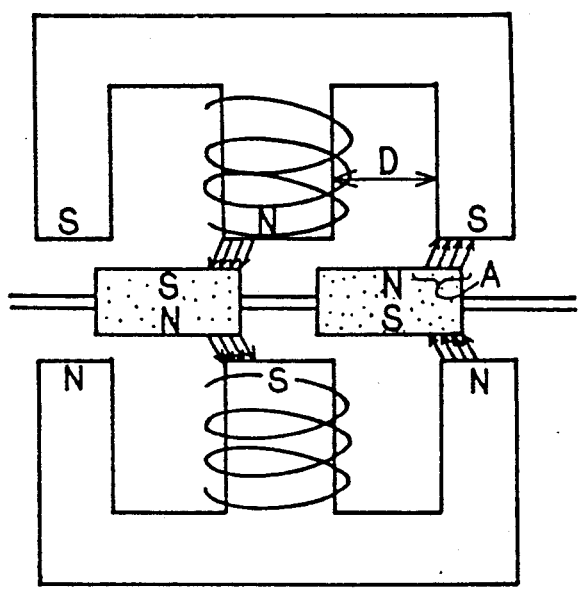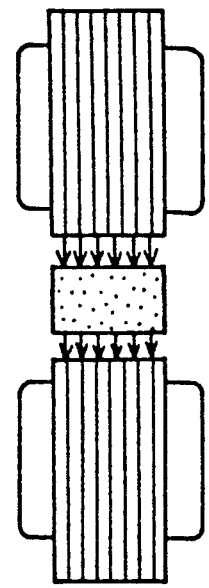
FIG.7a
FIG.7b
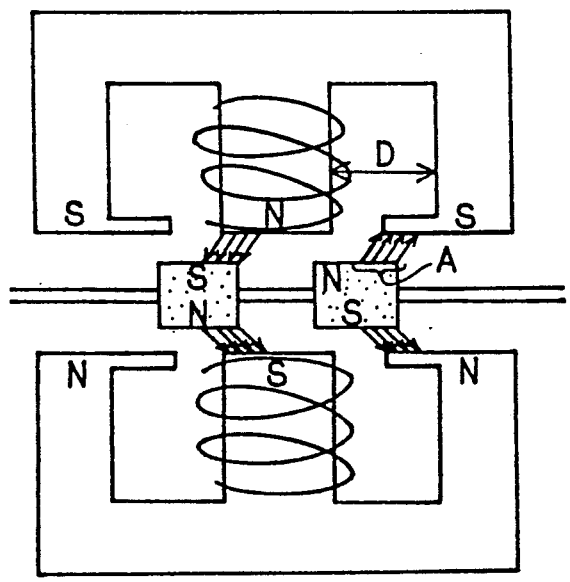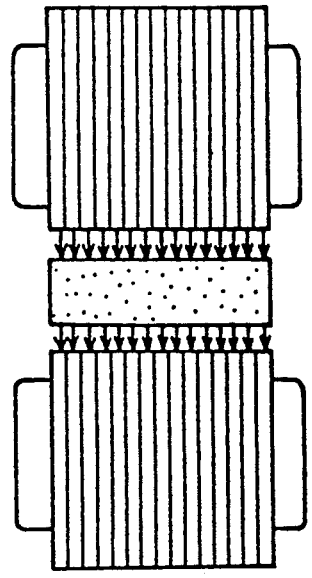

DIAPHRAGM-TYPE AIR PUMP WITH AN EFFICIENT CORE

CROSS REFERENCE TO RELATED APPLICATION

This application is a division of application Ser. No. 340,838 filed on Apr. 19, 1989.

This compared with that of a side pole is a continuation-in-part of application Ser. No. 231,553 filed on Aug. 12, 1988, abandoned on Jun. 14, 1989.

BACKGROUND OF THE INVENTION

The present invention relates to a diaphragmtype air pump, and more particularly to a diaphragm-type air pump capable of fully utilizing magnetomotive force of an electromagnet, for example, reducing leakage magnetic flux or effectively utilizing gap magnetic flux between main poles and side poles, whereby remarkably improving pump capacity, and lightening and miniaturizing pumps.

Hithereto, diaphragm-type air pumps have been used mainly in supplying oxygen to water tanks for pisciculture or domestic purifying chamber, or in sampling inspection gas for the monitoring of environmental pollution.

An electromagnet consisting of a core 30 comprising an E-shaped laminated iron plate shown in FIG. 15 and coils (not shown) wound around the core 30 has been used in the above-mentioned conventional diaphragm-type air pump. In FIG. 15, numerals 31 and 32 are a main pole and a side pole, respectively.

When increasing the number of turns of coils to increase magnetic flux and power of a pump in the electromagnet having a structure as described above, there is a restriction on the size of a "vacant space" for coils (refer to a in FIG. 15) so that the number of turns of coils is limited. Therefore, it has been proposed to increase the size of a vacant space for coils, or to increase the depth of the electromagnet (refer to b in FIG. 15). In either case, however, there are drawbacks as stated below so that the pump capacity cannot be improved That is, when increasing the size of a vacant space for coils, the increase of gap magnetic flux or passing magnetic flux is limited because of the increase of a gap or distance between the main pole and side pole. Further, the width of a permanent magnet overlapping the main pole and side pole is enlarged and accordingly the weight of the magnet is increased, so that the proper resonant frequency of a vibration system is lowered. As a result the pump capacity is lowered contrary to expectations. On the other hand, when increasing the width of the electromagnet, leakage magnetic flux ($\phi_1$) is increased (refer to FIG. 16) due to the increase of permeance coefficient. Moreover, effective magnetic flux ($\phi_2$) is not equally increased. As a result the pump capacity cannot be improved as is expected, since the magnetic flux is not efficiently utilized.

It is an object of the present invention to solve the above-mentioned drawbacks and to provide a diaphragm-type air pump capable of effectively utilizing magnetomotive force of the electromagnet, thereby remarkably improving pump capacity, and lightening and miniaturizing pumps.

SUMMARY OF THE INVENTION

The present invention consists of three embodiments having a common object of improving pump capacity.

In accordance with the first embodiment, there is provided a diaphragm-type air pump wherein a diaphragm connected to a rod having permanent magnets is driven by electromagnetic vibration of the rod caused by magnetic interaction between an electromagnet and the permanent magnets, characterized in that the electromagnet has a large distance between a main pole and a side pole thereof, and tips of the main pole and the side pole approach to each other so as to increase gap magnetic flux between the main pole and the side pole and enable the use of permanent magnets having smaller width than the distance between the main pole and side pole, by bending or protruding a tip of at least one of the main pole and the side pole toward a tip of the other pole, or by fixing a previously prepared tip portion to at least one of the main pole and the side pole in such a manner that tips of both poles approach to each other.

According to a diaphragm-type air pump of the first embodiment, a distance between a main pole and a side pole is enlarged so that the permeance coefficient of a core of an electromagnet becomes small and leakage magnetic flux is reduced. Further, effective magnetic flux is increased since at least one of the main pole and side pole is bent to protruded in such a manner that both tips of the main pole and side pole approach to each other. Still further, the width of a permanent magnet extending over the main pole and side pole can be shortened, so that the permanent magnet can be extended in its longitudinal direction according to the decreased or lessened portion of the permanent magnet. Accordingly, the magnetic attracting surface between the electromagnet and permanent magnet is increased. By the effective utilization of magnetic flux, magnetic interaction between the electromagnet and permanent magnet is strengthened whereby the improvement of pump capacity is realized.

Next, the second embodiment provides a diaphragm-type air pump wherein a diaphragm connected to a rod having permanent magnets is driven by electromagnetic vibration of the rod caused by magnetic interaction between an electromagnet and the permanent magnets, wherein dimensions are such that a main pole of the electromagnet has a small sectional area compared with a side pole and a supplementary magnetic path is formed at a tip of the main pole at the side of the permanent magnets, so that a corresponding magnetic surface between the main pole and the side pole is enlarged thereby increasing permeance coefficient and gap magnetic flux, and that a magnetic attracting portion between the main pole and the permanent magnets is enlarged and interaction therebetween is strengthened.

According to a diaphragm-type air pump of the second embodiment, the number of coils used can be reduced for obtaining the same magnetomotive force since a core of the coils has small sectional area. Accordingly, lightening and miniaturizing of the pump can be achieved. Further, since a supplementary magnet path is attached to the main pole and the magnetic attracting portion between the main pole and the permanent magnets is enlarged, the attraction or repulsion between the permanent magnets and the main pole including the supplementary magnetic path is strengthened and the permeance coefficient is increased. As a result, there can be increased gap magnetic flux and mutual electromagnetic force.

The third embodiment provides a diaphragm-type air pump wherein a diaphragm connected to a rod having permanent magnets is driven by electromagnetic vibration of the rod caused by magnetic interaction between an electromagnet and the permanent magnets, characterized in that a core of the electromagnet comprises a plurality of main poles and a side pole.

According to a diaphragm-type air pump of the third embodiment the amount of copper wires used can be reduced to obtain the same magnetomotive force, i.e. the same number of ampereturns (IN), in comparison with a pump using one main pole. Further, various kinds of pumps, from small-sized pumps to large-sized pumps, can be manufactured using parts of the same specification.

BRIEF EXPLANATION OF THE DRAWINGS

FIGS. 6a and 6b are a schematic explanatory plan view and a schematic explanatory side view of magnetic attracting surface of a conventional air pump, respectively;

FIGS. 7a and 7b are a schematic explanatory plan view and a schematic explanatory side view of magnetic attracting surface of an air pump of the first embodiment, respectively;

DETAILED DESCRIPTION

Referring now to the accompanying drawings, there is explained a diaphragm-type air pump of the present embodiment. Firstly the first embodiment is explained hereinafter.

Figure 1:
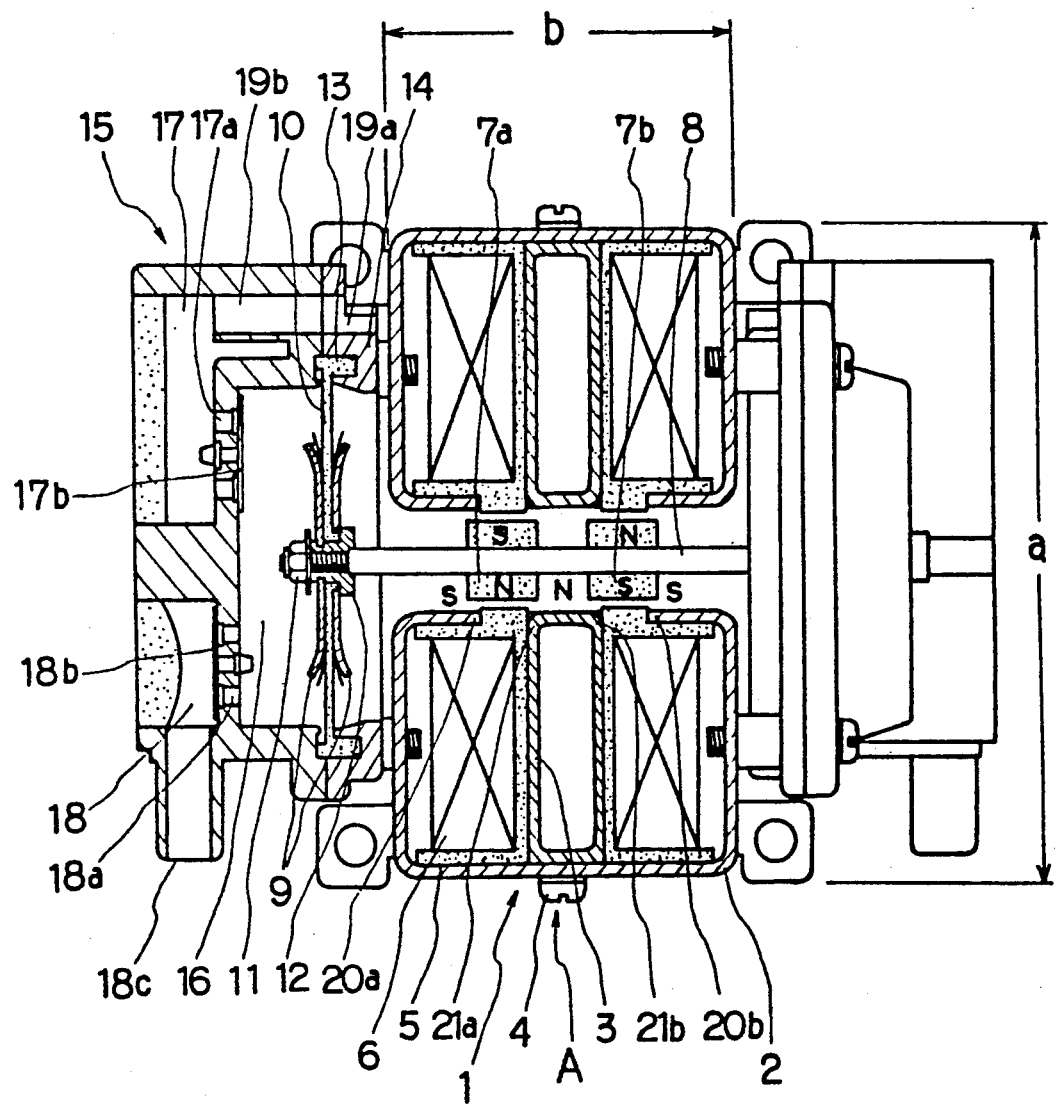
FIG. 1 is a sectional view partially including a plan view of a first embodiment of a diaphragm-type air pump of the present invention.
Figure 2:
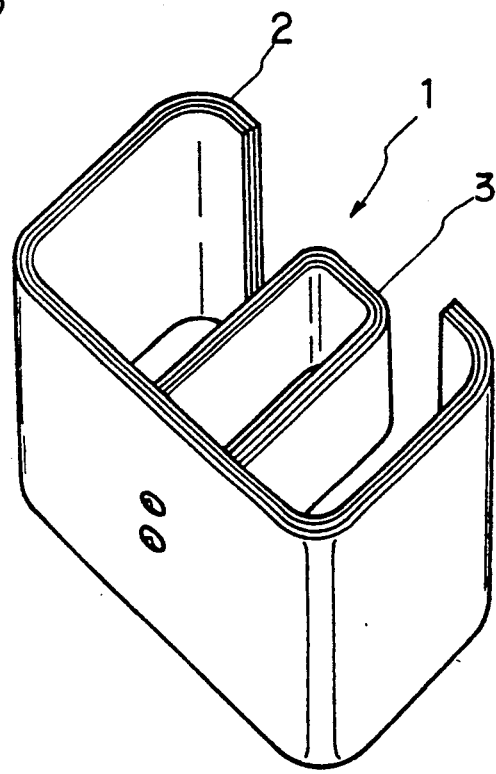
FIG. 2 is a schematic perspective view of an example of an electromagnet core in a diaphragm-type air pump of the first embodiment.
Figure 3:
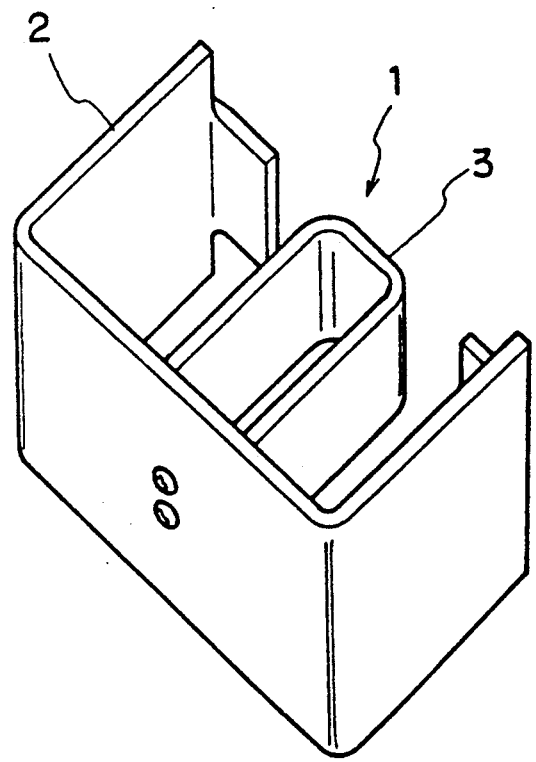
FIG. 3 is a schematic perspective view of another example of an electromagnet core.
Figure 4:
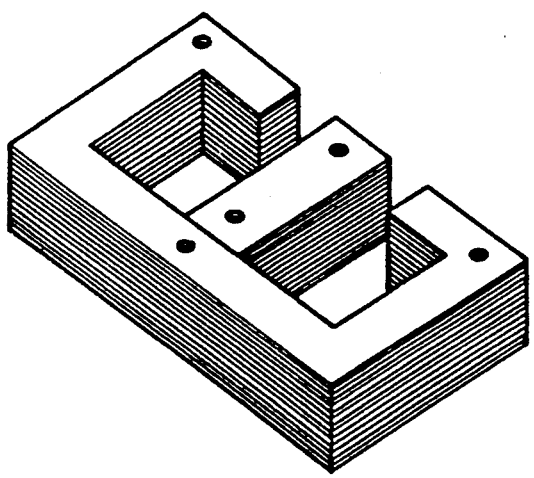
FIG. 4 is a schematic perspective view of still another example of an electromagnet core.

In FIG. 1, numeral 1 is a core of an electromagnet having an approximately E-shaped lateral section. The core 1 comprises a side pole 2 having a U-shaped lateral section and a main pole 3 disposed at a center of the side pole 2. Diaphragm-type air pumps according to the second and third embodiments have the same plan view as in FIG. 1. The main pole 3 and/or side pole 2 can be fabricated by incurvating laminated iron plate consisting of 2 to 20 sheets of iron plates each having a thickness of 0.2 to 0.5 mm as shown in FIG. 2, by crooking an iron plate having a thickness of 0.5 to 5 mm as shown in FIG. 3, or by laminating 10 to 100 sheets of cut and formed iron plates each having a thickness of 0.2 to 1 mm as shown in FIG. 4. The main pole 3 and/or side pole 2 can also be fabricated by crooking a laminated iron plate, by incurvating an iron plate, or by concentrating magnetic powder such as dust iron core, of which embodiments are not shown. FIG. 4 shows an E-shaped core consisting of laminated iron plate obtained by modifying a conventional E-shaped core in accordance with an idea of the first embodiment. In the specification, the term "incurvating" means—bending with relatively large R (radius)—, and the term "crooking" means—bending substantially without R, or folding--. In FIGS. 2 and 3, the main pole 3 is fixed to the side pole 2 by means of screws 4. The main pole 3 might be, however, fixed by other fixing methods, for example, by adhesion.

The core 1 shown in FIGS. 2 and 3 comprises the main pole 3 and the side pole 2 which are fabricated separately. Thanks to this separate structure, a coil bobbin around which coils are wound almost to a width of vacant space for coils (not shown) can be attached to the core 1. That is, when forming a main pole and a side pole in one body, a coil bobbin having a large amount of coils therearound so as to effectively utilize a wide width of vacant space for coils cannot be attached to the main pole. On the other hand, when forming a main pole and a side pole separately, an electromagnetic coil can be assembled by putting a coil bobbin having fully wound coils on a main pole 3, inserting the main pole 3 in the side pole 2 from above the side pole 2, and combining the main pole 3 and the side pole 2 by means of screws 4 and the like.

In the core 1, there is disposed a coil frame 5, made of 6,6-nylon and the like, which contacts the main pole 3. Copper wires are wound around the coil frame 5 to constitute a coil 6. An electromagnetic coil A consists of the core 1, coil frame 5 and coil 6.

A rod 8 having two permanent magnets 7a, 7b is disposed halfway between a pair of electromagnetic coils A. Both end portions of the rod 8 are connected to diaphragms 10 made of EPT (Ethylene Propylene Terpolymer) and the like through center plates 9. Center plates 9 are provided at both sides of the diaphragm 10, and push or pull the diaphragm 10 to move it right and left in FIG. 1. The center plates 9 and diaphragm 10 are sandwiched between a nut 11 and an attaching seat 12, and are fixed to a tip of the rod 8 by clamping with the nut 12.

An outer periphery of the diaphragm 10 is seated within a circular recess defined by a casing 15 and a diaphragm stand 14 made of PBT (Polybutylene Terephthalate) and the like which is fixed to the side pole 2 by a bolt. A recess 16 defined by the diaphragm 10 and the casing 15 functions as a compression chamber.

The casing 15 includes a suction room 17 and a discharge room 18 besides the above recess 16. A communicating hole 17a is formed on a partition wall between the suction room 17 and the compression chamber, and a communicating hole 18a is formed on a partition wall between the discharge room 18 and the compression chamber. A suction valve 17b and a discharge valve 18b are respectively provided at the communicating hole 17a and communicating hole 18b. Numeral 18c is a discharge port whereto a tube (not shown) and the like is connected.

The casing 15 is made of PBT and the like, and is fixed to the side pole by means of a bolt together with the diaphragm stand 14 in the embodiment of FIG. 1. In FIG. 1, a right diaphragm and a casing are depicted as a plan view, so that the insides thereof are not shown. They have, however, the same constitution as in left portion described hereinbefore.

Next there is briefly explained an operation of the diaphragm-type air pump of the present embodiment.

The flow of alternating current in the electromagnetic coil A alternately generates a north pole and a south pole at both ends of the electromagnetic coil A corresponding to the change of alternating current. Then the main pole and side pole, both of which are made of magnetic substance, are magnetized corresponding to the change of alternating current, whereby alternately generating different polarity at both ends of the main pole and side pole.

In a certain half-wave length of alternating current, the end of the side pole is magnetized to be a south pole when the end of the main pole is magnetized to be a north pole. In that case, attraction acts between the permanent magnet 7a and an end 20a of the side pole, and between the permanent magnet 7b and an end 21b of the main pole. On the other hand, repulsion acts between the permanent magnet 7b and the end 20b of the side pole, and between the permanent magnet 7a and the end 21a of the main pole. Thus the rod 8 moves to the left in FIG. 1. When alternating current changes from the above-mentioned half-wave length to a next half-wave length, the repulsion changes to attraction and the attraction changes to repulsion, so that the rod moves to the right.

Thus the rod reciprocates from right to left corresponding to the frequency of alternating current. The diaphragm 10 vibrates from right to left according to the movement of the rod 8. When the rod 8 moves to the right, the suction valve 17b opens while the discharge valve 18b is closed. Fluid which is introduced into the suction room 17 through the suction hole 19a and the vent hole 19b enters the compression chamber through the communicating hole 17a. When the rod 8 moves to the light, the discharge valve 18b opens while the suction valve 17b is closed. Fluid in the compression chamber is discharged from the discharge port 18c through the communicating hole 18a and the discharge room 18. In this way, the diaphragm-type air pump of the present invention drives.

Figure 5:
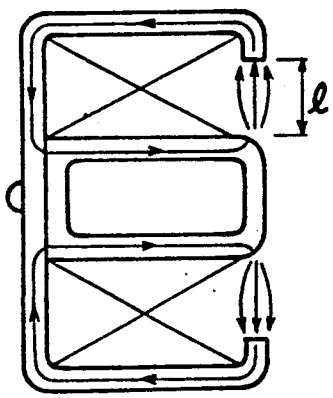
FIG. 5 is an explanatory view showing a state of magnetic flux of the core shown in FIG. 2.

The distinguishing feature of the diaphragm-type air pump of the first embodiment having a construction as stated above resides in a construction of the core of the electromagnetic coil. That is, in the first embodiment, a main pole and/or side pole are/is separately fabricated by incurvating or crooking laminated iron plate or single iron plate, or laminating iron plates which are cut and formed beforehand. A core is formed by incorporating or uniting the main pole and the side pole on assemblying an electromagnetic coil. In that case, a distance between the main pole and side pole is enlarged. Further, tips of the main pole and side pole approach to each other by bending or protruding a tip of at least one of the main pole and side pole toward a tip of the other pole, or by fixing a previously prepared tip portion to at least one of the main pole and side pole in such a manner that tips of both poles approach to each other. In the above-mentioned core, permeance coefficient is decreased due to a large distance between the main pole and side pole, so that leakage magnetic flux is reduced. Further, gap magnetic flux is increased since the tip of the main pole and that of the side pole approach to each other to make a working gap $\lambda$ small (see FIG. 5). In this way, the electromagnetic core in the first embodiment can reduce leakage magnetic flux which has been a drawback of conventional electromagnetic cores, and increase gap magnetic flux which directly influences on the magnitude of magnetic mutual action with a permanent magnet, so that magnetic flux generated in the electromagnetic coil can be extremely effectively utilized. Moreover, according to the first embodiment, the width of the permanent magnet can be narrowed so that magnetic attracting portion can be lengthened according to the amount of decreased permanent magnetic as long as tuning between characteristic frequency determined by elasticity of the diaphragm and weight of a rod portion and frequency of power source can be maintained. Thus, output of pumps can be increased and pump efficiency can be improved. That is, the width C and length B of the permanent magnet can be changed, while keeping the size D shown in FIG. 6a constant, into $C_1$ ($=C/2$) and $B_1$ ($=2B$) as shown in FIGS. 7a and 7b. In that case, the area of magnetic attracting surface ($A_1 \times B_1$) of the air pump of the first embodiment shown in FIGS. 7a and 7b is twice as large as that ($A \times B$) of conventional air pump. Accordingly, strong vibration power can be obtained whereby improving the pump capacity. The density of gap magnetic flux can be increased still more when the crooked tip of the side pole is partially cut to make the height of side pole equal to that of main pole, as shown in FIG. 3.

Next the second embodiment is explained. The second embodiment has a feature that a winding core has a small sectional area and that a supplementary magnetic path is provided at a tip of a main pole at the side of a permanent magnet. That is, an air pump according to the second embodiment can change a magnetic path of low magnetic flux density in the conventional electromagnet into a magnetic path of high magnetic flux density on the basis of an idea that a slender winding core can effectively reduce the amount of wire used while maintaining the same magnetomotive force. A very slender iron core (see FIG. 10) is employed in the second embodiment.

However, when the sectional area of the main pole is made small, i.e. the winding core is made slender, attraction or repulsion which functions between the main pole and permanent magnet is weakened because a portion of the main pole functioning with the permanent magnet is small. Further, the maine poles corresponding magnetic surface with the side pole and permeance coefficient become small so that gap magnetic flux is reduced. The supplementary magnetic path in a diaphragm-type air pump of the second invention prevents the fall of magnetic mutual function between an electromagnet and a permanent magnet.

Figure 8:
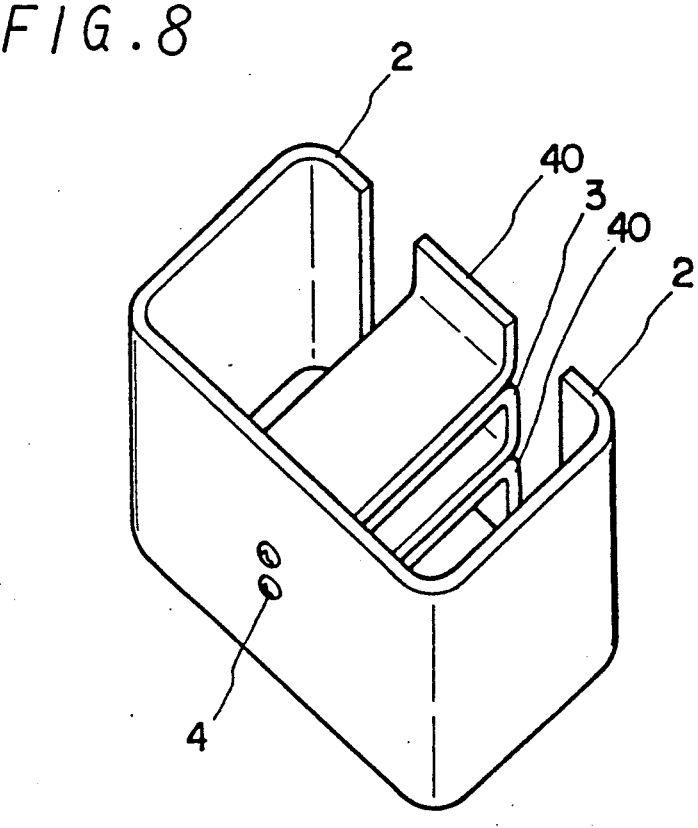
FIG. 8 is a schematic perspective view of an example of an electromagnet core in a diaphragm-type air pump of the second embodiment.
Figure 9:
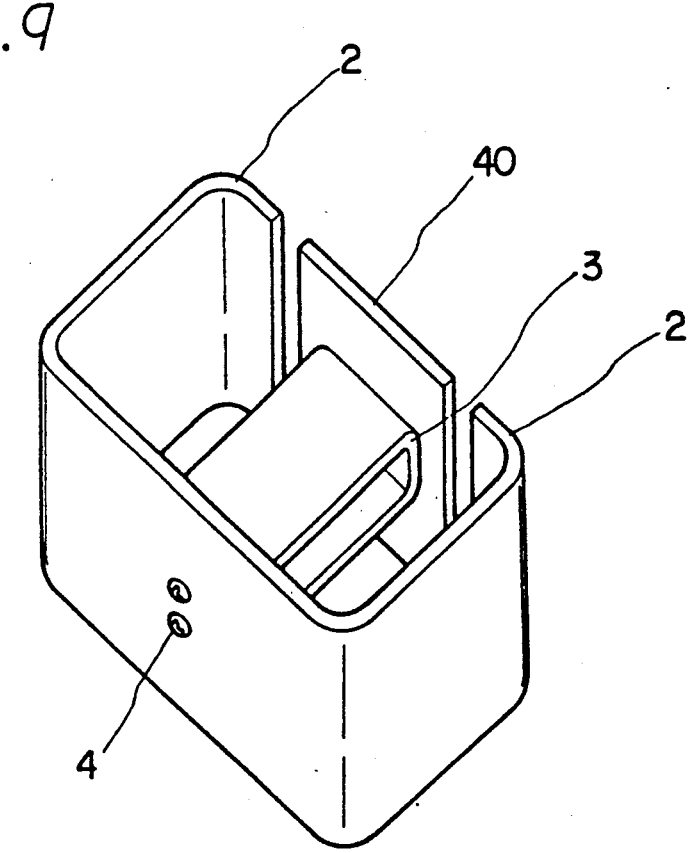
FIG. 9 is a schematic perspective view of another example of an electromagnet core in a diaphragm-type air pump of the second embodiment.
Figure 10:
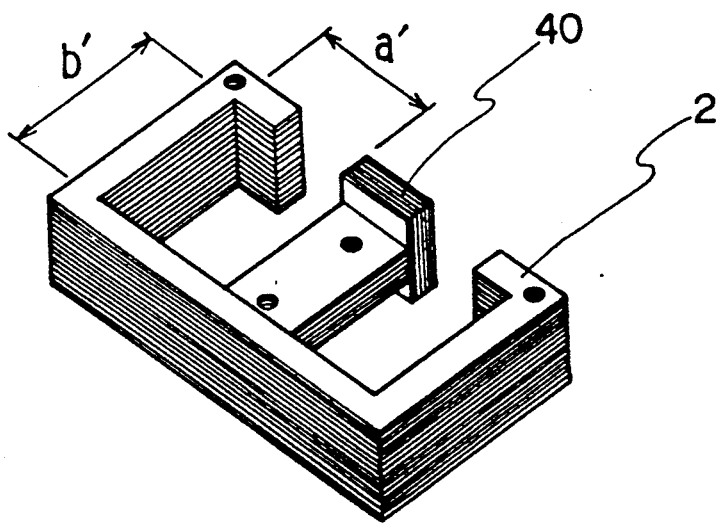
FIG. 10 is a schematic perspective view of a core obtained by reconstructing the E-shaped core of the first embodiment shown in FIG. 4 according to an idea of the second embodiment.

In FIG. 1 (which also shows a plan view of a diaphragm-type air pump of the second embodiment as stated above), FIG. 8 and FIG. 9, numeral 1 is a core of an electromagnet having an approximately E-shaped lateral section. The core 1 comprises a side pole 2 having a U-shaped lateral section, a main pole 3 disposed at a center of the side pole 2, and supplementary magnetic path 40 provided at a tip of the main pole 3. The main pole 3 and/or side pole 2 and/or supplementary magnetic path 40 can be fabricated by crooking an iron plate having a thickness of 0.5 to 5 mm, by incurvating a laminated iron plate consisting of 2 to 20 sheets of iron plates each having a thickness of 0.2 to 0.5 mm, by crooking laminated iron plate, or by incurvating an iron plate. They can also be fabricated by concentrating magnetic powder such as dust iron core. In FIGS. 8 and 9, the main pole 3 is fixed to the side pole 2 by means of screws 4. The main pole 3 might be, however, fixed by other fixing methods, for example, by adhesion. The supplementary magnetic path 40 prevents the fall of magnetic interaction between the main pole 3 and permanent magnet due to the reduction of magnetic attracting portion of the main pole 3 with the permanent magnet, as sectional area of the main pole 3 is reduced to save the amount of coils to be used. The supplementary magnetic path 40 also increases corresponding magnetic surface with the side pole to increase permeance coefficient and gap magnetic flux. The supplementary magnetic path 40 might be L-shaped plate members to be attached on the upper and bottom surfaces of the rectangular main pole as shown in FIG. 8. In that case, shorter sides of the L-shaped members function as a supplementary magnetic path. The supplementary magnetic path 40 might be a plate member to be attached to the front of the main pole. In that case, a portion extending from the front of the main pole 3 functions as a supplementary magnetic path. FIG. 10 shows a core obtained by modifying a E-shaped core of the first embodiment shown in FIG. 4 according to an idea of the second embodiment, wherein the whole core is made slender and a supplementary magnetic path is attached to the front of the main pole having a small sectional area. In the core of FIG. 10, the size of vacant space available for coils $a' \times b'$ becomes larger than the conventional E-shaped core. The supplementary magnetic path 40 and main pole 3 might be fabricated in one body, or might be separately fabricated and assembled thereafter.

A feature of the diaphragm-type air pump of the second embodiment resides in providing supplementary magnetic paths as stated above at a main pole having a reduced sectional area. The supplementary magnetic path widens and lengthens a portion of the main pole working with permanent magnets, and enlarges a magnetic path corresponding to the side pole, so that the magnetic interaction between the electromagnet and permanent magnets can be strengthened. Thus, disadvantages accompanying the reduction of sectional area of the main pole for saving coils can be solved. In this connection, it is preferable that the height of the supplementary magnetic paths are approximately equal, when provided at the main pole, to that of side pole and permanent magnets. The width of the supplementary magnetic path might be larger than that of the main pole.

Further, according to the second embodiment, inefficient and irrational use of magnetic flux caused by the difference of magnetic flux density between permanent magnet and electromagnet can be solved.

That is, when a permanent magnet extended in its longitudinal direction in accordance with the first invention is, for example, a ferrite magnet, the magnetic flux density ($\phi_1$) at a magnetic attracting surface is about 2000 gauss. On the other hand, the magnetic flux density ($\phi_2$) of a usual electromagnet is as much as 6000 gauss. Therefore, the proportion of area of magnetic attracting surface might be three to one from a viewpoint of the quantities of magnetic flux effecting each other. In that case, passage of magnetic fluxes change with respect to magnetic attracting surfaces, so that the use of magnetic fluxes becomes extremely irrational and inefficient.

Figures 11A, 11B, 11C:
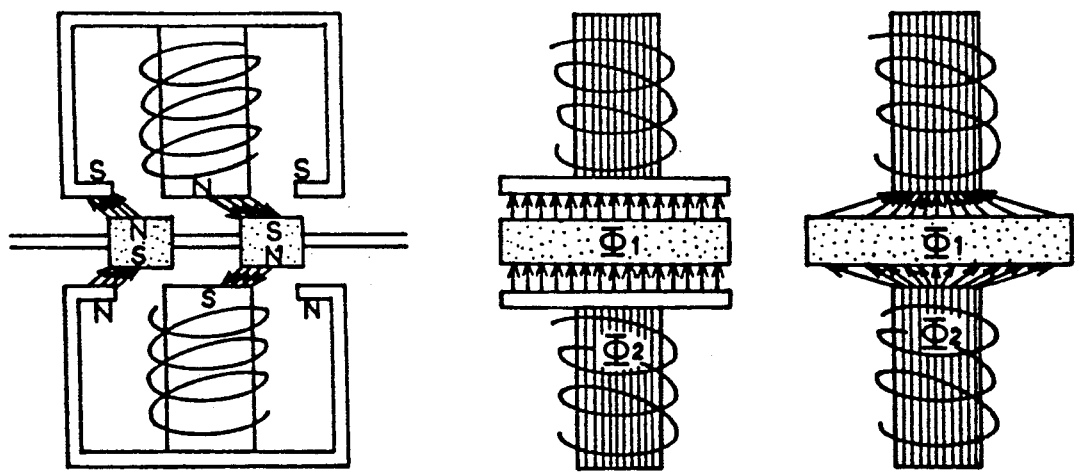
FIGS. 11a and 11b are a schematic explanatory plan view and a schematic explanatory side view of magnetic attracting surface of an air pump of the present invention, respectively.
FIG. 11c is a schematic explanatory side view of magnetic attracting surface of an air pump wherein permanent magnets are extended in its longitudinal direction.

On the other hand, when the supplementary magnetic path is employed like an air pump according to the second embodiment, magnetic fluxes are dispersed as shown in FIG. 11b so that magnetic flux density of the electromagnet is reduced to about 2000 gauss. Accordingly rational and efficient interaction is obtained between the permanent magnet and electromagnet. That is, though the magnetic flux density at a place where lines of magnetic force generate is high because of the small sectional area of iron core, attracting force between permanent magnet and electromagnet can be extremely effectively utilized at a magnetic attracting surface since lines of magnetic force are distributed through the supplementary magnetic path to such a place that gives good efficiency.

Figure 14A:
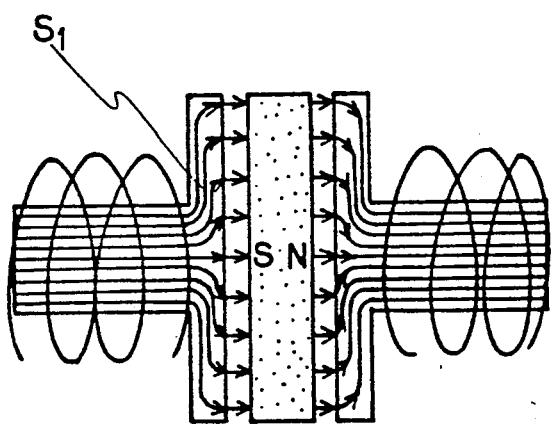
FIGS. 14a and 14b are schematic explanatory side views of magnetic attracting surface of a middle-sized air pump and a large-sized air pump, respectively.
Figure 14B:
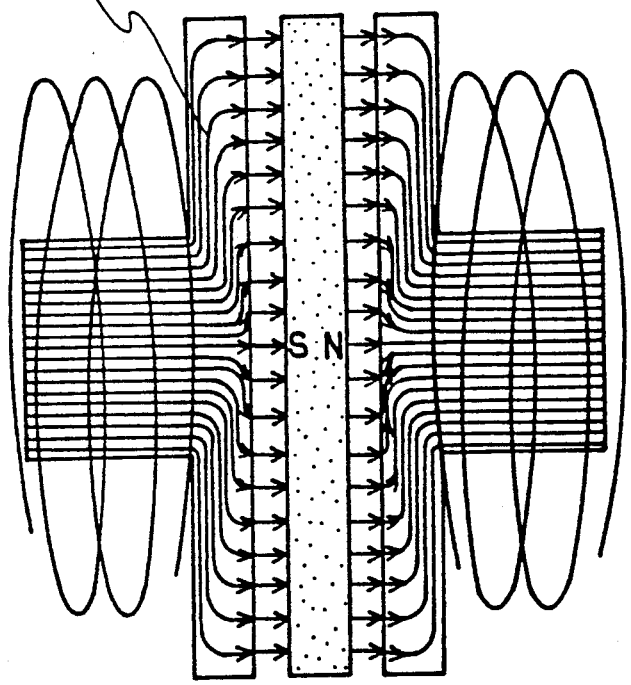
Figure 15:
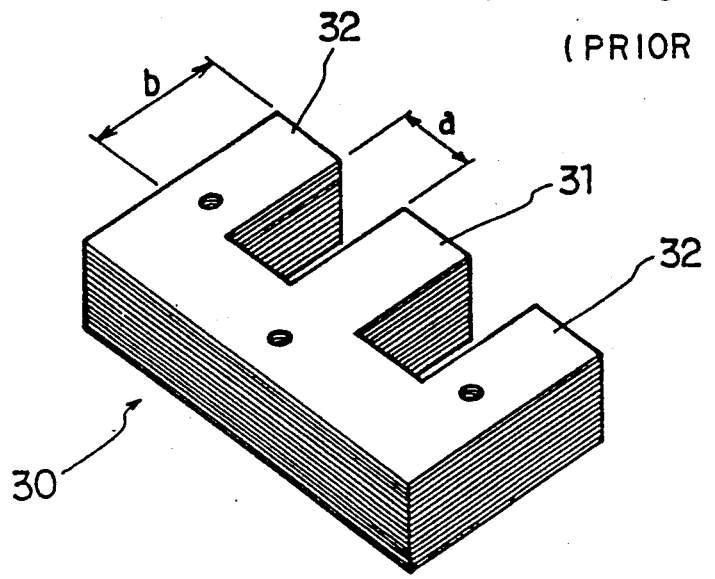
FIG. 15 is a schematic perspective view of a conventional E-shaped electromagnet core.
Figure 16:
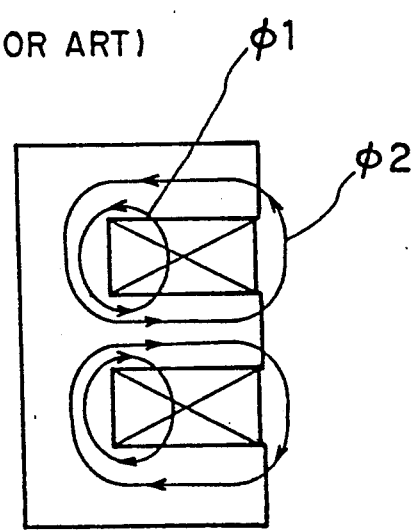
FIG. 16 is an explanatory view showing a state of magnetic flux of the core shown in FIG. 15.

Next the third embodiment is explained. The third embodiment improves the limitation of effective utilization of magnetic flux, of which limitation is due to the use of a single main pole. That is, even in electromagnets according to the first and second embodiments, the increase ratio of copper wire is enlarged with the increase of sectional area of the main pole when pump capacity multiplies twice or three times. The use of copper wire therefore becomes uneconomical and inefficient. When the sectional area of the main pole is small, it does not require much copper wire to wind the main pole one time. However, the sectional area of the main pole is enlarged as copper wire is wound around the main pole, so that an amount of copper wire per one winding is gradually increased. Further, in a middle-sized pump (such a pump that has a pump output of about 30 to 80 λ./min.), a supplementary magnetic path can be composed of steel sheets of about 2 to 3 mm. thick since magnetic flux density at a portion $S_1$ of the supplementary magnetic path is not so high as shown in FIG. 14a. However, in the case of a large-sized pump (such a pump that has a pump output of about not less than 120 λ./min.), the amount of magnetic flux passing through a portion $S_2$ increases rapidly so that the thickness of steel sheet is required to be increased depending on the increase of magnetic flux. In that case, core loss due to the thickness of steel sheets is rapidly increased and heat generates increasingly. In order to prevent the core loss and heat generation, it is necessary to use laminated ten and a few steel sheets of 0.2 to 0.5 mm. thick and therefore the structure of the supplementary magnetic path becomes very complicated. The third embodiment solves the problem that the amount of copper wire used is increased inefficiently and that the structure of the supplementary magnetic path becomes very complicated, and is characterized in that a core of an electromagnet comprises a plurality of main poles and a side pole.

Figure 12:
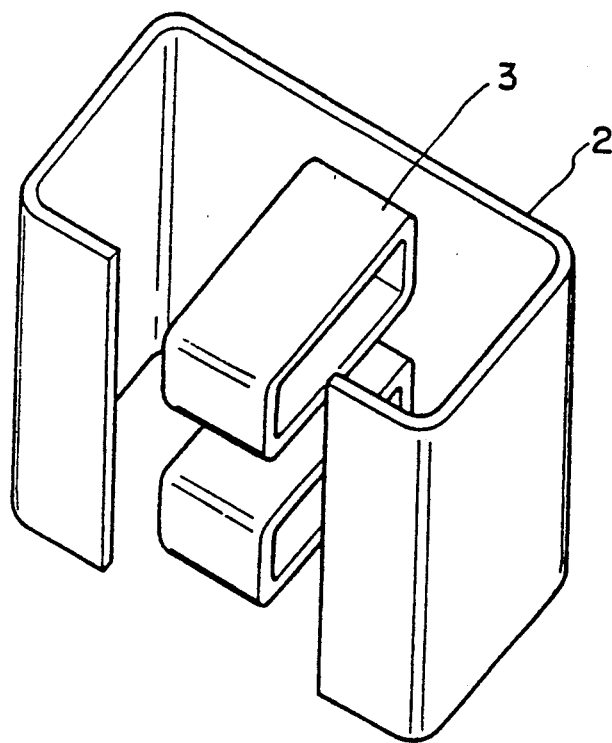
FIG. 12 is a schematic perspective view of an example of an electromagnet core in a diaphragm-type air pump of the third embodiment.
Figure 13:
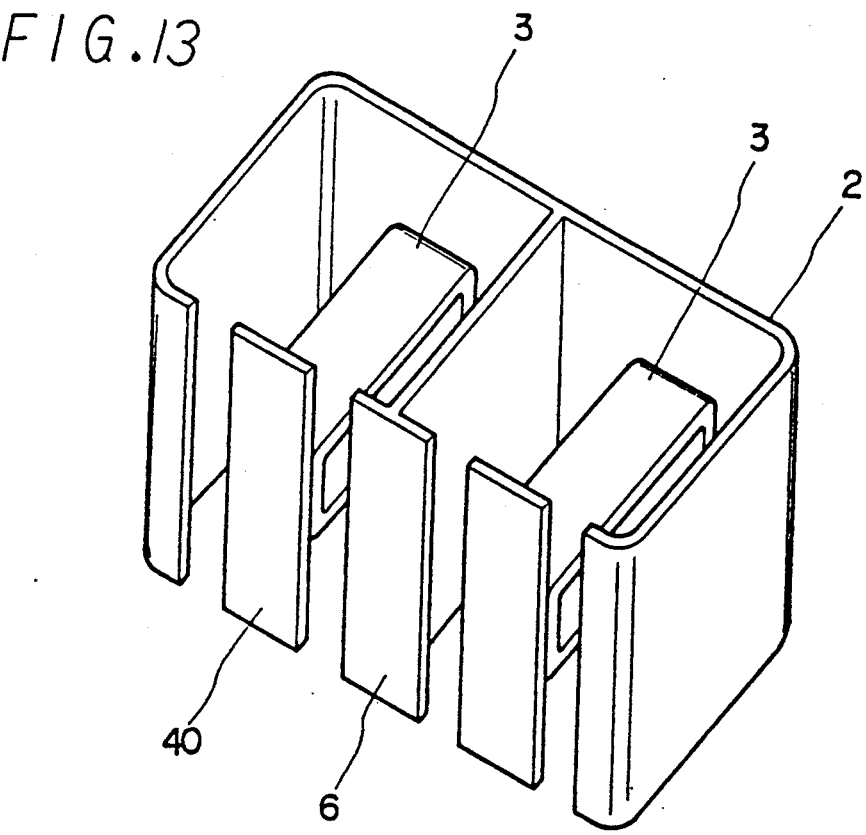
FIG. 13 is a schematic perspective view of another example of an electromagnet core in a diaphragmtype air pump of the third embodiment.

FIGS. 12 and 13 are schematic perspective views of examples of electromagnets in diaphragm-type air pumps according to the third embodiment. In FIG. 12, numeral 1 is a core of an electromagnet having an approximately E-shaped lateral section. The core 1 comprises a side pole 2 having a U-shaped lateral section and two main poles 3 disposed at a center of the side pole 2. The main poles 3 are arranged perpendicular to a vibration direction of a rod 8 of the diaphragm-type air pump (see FIG. 1). In the example of FIG. 13, two main poles are arranged parallel to a vibration direction of the rod. In that case, it is necessary to provide a supplementary pole 6 between two main poles to enlarge acting surface and to adjust polarity of the core. The number of main poles is not limited to two as in FIGS. 12 and 13, but might be not less than three. The main poles might be arranged two-dimensionally, i.e. both perpendicular to and parallel to a vibration direction of the rod. The main pole 3 and/or side pole 2 can be fabricated by incurvating a laminated iron plate consisting of 2 to 20 sheets of iron plates each having a thickness of 0.2 to 0.5 mm as shown in FIG. 2, by crooking an iron plate having a thickness of 0.5 to 5mm as shown in FIG. 3, or by laminating 10 to 100 sheets of cut and formed iron plates each having a thickness of 0.2 to 1 mm as shown in FIG. 4. The main pole 3 and/or side pole 2 can also be fabricated by crooking a laminated iron plate, by incurvating an iron plate, or by concentrating magnetic powder such as dust iron core, of which embodiments are not shown.

A distinguishing feature of the third embodiment resides in a point that an electromagnet core consists of a plurality of main poles 3 and a side pole 2. By the use of a plurality of main poles, there can be reduced an amount of copper wires used for the same magnetomotive force, i.e. ampere-turn (IN). Further, main poles of the same specification can be applied to various kinds of pumps, i.e. from small-sized pumps to large-sized pumps.

From a viewpoint of effective utilization of a width of vacant space for coils, it is preferable that the main pole 3 and side pole 2 are separately fabricated; the main pole 3, around which a coil bobbin is set, is inserted in the side pole 2 from above the side pole 2; and then the main pole 3 is fixed to the side pole 2 by means of screws and the like, as shown in FIGS. 11 and 12. In that case, the fixation of the main pole 3 and side pole 2 can be carried out by other means such as adhesion.

When supplementary magnetic paths 40 are provided, as shown in FIG. 13, at tips of main poles at the side of permanent magnets, the magnetic attracting portion of main poles with permanent magnets are enlarged so that attraction or repulsion between main poles including supplementary magnetic paths and permanent magnets can be increased. Further, a magnetic path corresponding to the side pole is enlarged and permeance coefficient is increased, whereby increasing mutual electromagnetic force between the main poles and side pole. From a viewpoint of sufficiently producing the effects, it is preferable that the height of the supplementary magnetic paths is approximately equal, when provided at the main pole, to that of the side pole and permanent magnets. The width of the supplementary magnetic paths might be larger than that of the main poles. The supplementary magnetic paths can be fabricated by the same materials and methods as in the above-mentioned main pole 3 and side pole 2.

As described above, the diaphragm-type air pump of the present invention enables the improvement of pump capacity and the lightening of pumps.

Figure 17:
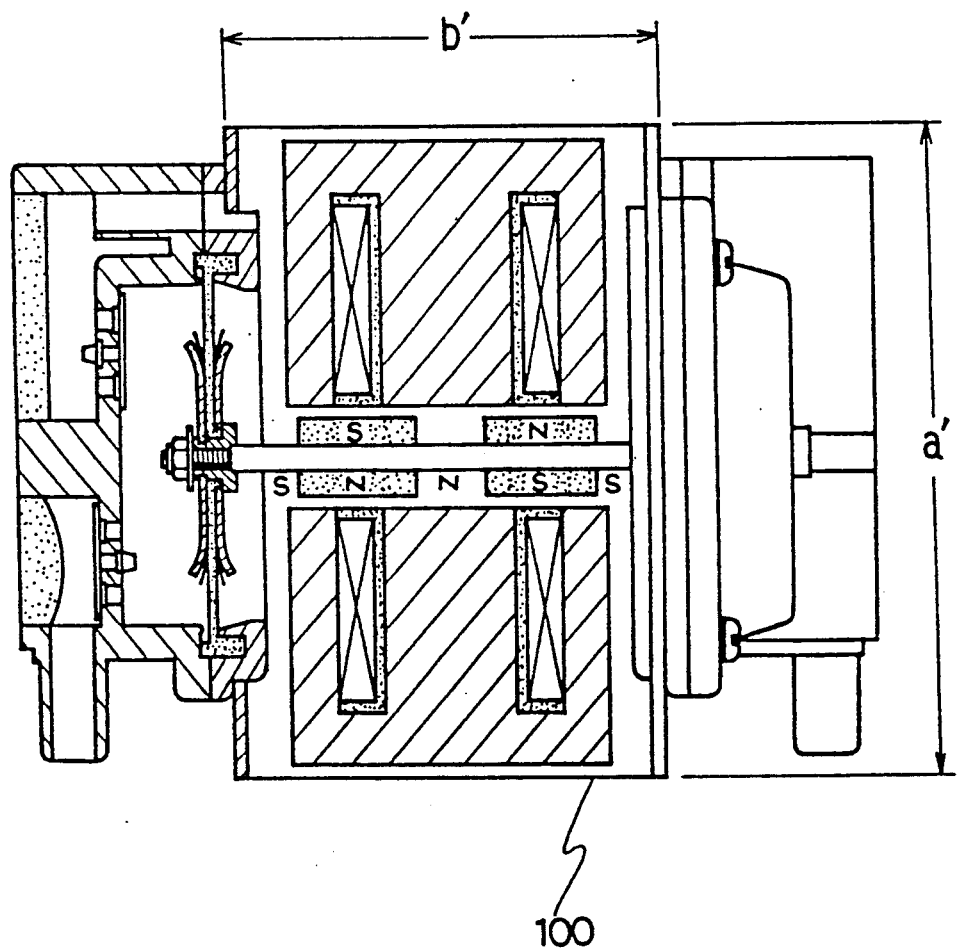
FIG. 17 is a sectional view partially including a plan view of a conventional diaphragm-type air pump.

To say more precisely, in the first invention, a distance between a main pole and a side pole is enlarged, so that the number of windings of coils and the amount of magnetic flux can be increased. Further, by the enlargement of the distance, permeance coefficient is decreased and accordingly leakage magnetic flux is reduced. Still further, gap magnetic flux can be increased because the tips of main pole and side pole approach to each other. In this way, the first embodiment enables extremely effective utilization of magnetic flux generated by the electromagnetic coil, whereby strengthening a vibration force of a rod and remarkably improving discharge capacity of pumps. The weight of a core can be reduced compared to conventional E-shaped cores, whereby pumps can be lightened. Moreover, there can be omitted the use of conventional frames serving to contain electromagnetic coils and rods and to fix diaphragm tables and casings, since diaphragm tables and casings can be directly fixed to side poles. That is, a conventional air pump having a frame 100 as shown in FIG. 17 can be miniaturized to an air pump shown in FIG. 1. The size of a' and b' (see FIG. 17) can be reduced, for example, by about 20 to 30 %. In other words, the size of a and b in FIG. 1 are respectively about 70 to 80 % of a' and b' in FIG. 17.

In the diaphragm-type air pump of the second embodiment, an amount of coils used can be reduced for obtaining the same magnetomotive force, since the sectional area of the main pole, i.e. winding core, is decreased. Accordingly pumps can be lightened and miniaturized. Further, the supplementary magnetic path is provided at the main pole having reduced sectional area, so that a magnetic path corresponding to the side pole is enlarged increase permeance coefficient, and gap magnetic flux d. The magnetic attracting portion with permanent magnets is widened and lengthened, so that magnetic interaction between the electromagnet and permanent magnets can be strengthened. Therefore, air pumps of large capacity in spite of small size and light weight can be obtained.

Moreover, in the diaphragm-type air pump of the third embodiment, an amount of copper wire used can be reduced to obtain the same magnetomotive force, i.e. ampere-turn (IN). Parts of the same specification can be applied to various kinds of pumps by changing the number of parts to be used.

What is claimed is:

1. A diaphragm-type air pump wherein a diaphragm connected to a rod having permanent magnets is driven by electromagnetic vibration of the rod caused by magnetic interaction between an electromagnet and the permanent magnets, wherein said electromagnet of said air pump comprises:

a core having a main pole and at least one side pole; said main pole and said at least one side pole being fixed to each other to form a path for magnetic flux through said core having a gap between opposing tips of said poles, wherein a dimension of said main pole at the gap is smaller than a corresponding dimension of said at least one side pole; and a supplementary magnetic path formed at a tip of the main pole adjacent the permanent magnets to increase said dimension of said main pole so that a corresponding magnetic surface of said main pole forming said gap between the main pole and the at least one side pole is enlarged, thereby increasing permeance coefficient and gap magnetic flux and enlarging a magnetic attracting portion between the main pole and the permanent magnets such that interaction therebetween is strengthened.

2. The air pump of claim 1 wherein said main pole comprises a plurality of poles fixed to said at least one side pole.